United States Patent [19]
Bolshakov et al.

[11] 3,896,084
[45] July 22, 1975

[54] COPOLYMERS OF ACETONE WITH UNSATURATED COMPOUNDS OF ALIPHATIC SERIES AND A METHOD FOR PREPARING SAME

[76] Inventors: Alexandr Ivanovich Bolshakov, Obschezhitie NNTS, kv. 309; Alfa Ivanovich Mikhailov, ulitsa Pervaya, 16, kv. 11; Igor Mstislavovich Barkalov, ulitsa Galushkina, 17, kv. 92; Vitaly Iosifovich Goldansky, Vorobievskoe shosse, 2b, kv. 45, all of Moscow, U.S.S.R.

[22] Filed: May 30, 1973

[21] Appl. No.: 365,174

[30] Foreign Application Priority Data
July 21, 1972 U.S.S.R............................ 1813887

[52] U.S. Cl...... 260/63 R; 204/159.22; 260/29.6 H; 260/30.4 R; 260/30.4 N; 260/32.8 R; 260/32.8 N; 260/33.4 R; 260/63 N
[51] Int. Cl............................................ C08g 15/00
[58] Field of Search............... 260/63 R; 204/159.22

[56] References Cited
UNITED STATES PATENTS
3,721,648  3/1973  Ehrig et al. .................... 260/47 UA

*Primary Examiner*—Lester L. Lee
*Attorney, Agent, or Firm*—Holman & Stern

[57] ABSTRACT

The invention relates to copolymers of acetone with acrylic acid or its derivatives, and also to the method for preparing them. The method consists in that a mixture of acetone and acrylic acid or its derivatives is frozen, the solid mixture of the monomers which is obtained is acted upon by ionizing radiation, the irradiated solid mixture is heated to a temperature above its melting point and the end product is finally isolated. The said copolymers of acetone have high thermal stability (up to a temperature of 150°–200°C) and can therefore be used in various branches of industry, for example, for preparing water-soluble transparent films and fibres, additives for the manufacture of paper, etc. The method ensures the preparation of said copolymers at high yields (up to 90 per cent of the weight of the starting reaction mixture).

7 Claims, No Drawings

COPOLYMERS OF ACETONE WITH UNSATURATED COMPOUNDS OF ALIPHATIC SERIES AND A METHOD FOR PREPARING SAME

This invention relates to copolymers of acetone with unsaturated compounds of the aliphatic series and to methods for preparing them.

Acetone copolymers can be used in various branches of industry, for example in the manufacture of water-soluble transparent films and fibres, additives in the paper-making industry, etc.

Known in the prior art are copolymers of acetone with unsaturated compounds of the aliphatic series, namely, propylene or dimethylketene.

Known also are methods for preparing acetone copolymers with propylene or dimethylketene by catalytic copolymerization of the said monomers in the liquid phase at a temperature from −70° to −78°C with subsequent isolation of the end product, for example by distillation of non-polymerized monomers.

In the above cited methods, the copolymerization of acetone with propylene is carried out in the presence of a Ziegler-Natta catalyst, while the copolymerization of acetone with dimethylketene is effected in the presence of alkylates or alcoholates of lithium.

The disadvantage of the known methods is low yields of the end products (0.5 per cent of the starting reaction mixture weight). Owing to this extremely low efficiency of the known methods, propylene is not copolymerized with dimethylketene on a practical scale.

We propose now copolymers of acetone with unsaturated compounds of the aliphatic series, namely, acrylic acid or its derivatives, and also a method for preparing them, which would ensure high yields of the end product.

The copolymers of acetone with acrylic acid or its derivatives are stable to the action of temperatures up to 150°–200°C, and as has already been said, can be used in various branches of industry.

The proposed copolymers of acetone with acrylic acid or its derivatives can be prepared by a method which, according to the invention, consists in that a mixture of the starting monomers is frozen, the solid mixture is acted upon by ionizing radiation, the obtained irradiated mixture of the monomers is heated to a temperature above its melting point, and the end product is finaly isolated.

The proposed method ensures the production of copolymers of acetone at high yields (to 90 per cent of the weight of the starting reaction mixture).

In order to obtain a homogeneous solid mixture of the monomers, it is recommended that the freezing of the starting monomers should be carried out at a rate of 200°–500° per minute.

For preparing copolymers of acetone of high molecular weight (of about $10^5$) and at high yields, it is recommended that the solid mixture of monomers should be acted upon by ionizing radiation in the integral dose to 1–10 Mrad.

In order to increase the yield of the copolymers of acetone, it is recommended that the irradiated mixture of the monomers should be heated to a temperature of −30°C, at which the copolymerization process is practically completed.

In order to improve the conditions for isolation of the end products, the irradiated solid mixture of the monomers should be heated to a temperature above −30°C.

In order to preclude the rupture of the rapidly growing polymer chains, and to increase the yield of the end products, the irradiated solid mixture of the monomers should be heated to a temperature not above −30°C at a rate of 0.1–0.5 degree per minute.

The method for preparing copolymers of acetone with acrylic acid or its derivatives is realized as follows.

Acrylic acid or its derivatives, for example, esters, anhydrides, imides, are dissolved in acetone, the components being taken at any proportion, depending on the desired composition of the copolymers. With a higher proportion of acetone in the copolymer, the articles (films, fibres, etc) become more transparent, and their thermal stability and strength are high, and vice versa, as the acrylic acid, or its derivatives become prevailing in the mixture, the copolymer becomes more brittle, less transparent but its thermal stability increases.

The prepared mixture of the starting monomers (solution) is frozen, preferably at a rate of 200°–500° per minute. The frozen mixture is acted upon by ionizing radiation, for example, by roentgen rays, gamma rays of $Co^{60}$, or fast electrons, which produce active centres of copolymerization. The integral dose of the ionizing radiation depends on the desired molecular weight and the yield of the end product. As has already been said, in order to obtain copolymers of acetone having high molecular weight at high yields of the product, the integral dose of radiation should be within 1–10 Mrad. Decreasing the integral dose, with respect to the optimum limit, reduces the yield of the end product, while increasing the dose, with respect to the said limit, decreases the molecular weight of the copolymer. After the irradiation is stopped, the solid mixture of the monomers is heated to the temperature of its melting point. As the said solid mixture is heated, acetone is copolymerized with acrylic acid or its derivatives. It should be noted that the process of copolymerization is practically completed during heating the irradiated solid mixture to the temperature of −30°C. However, for improvement of the conditions for isolating the end products, the irradiated mixture should preferably be heated to a temperature above −30°C, for example to room temperature.

The heating of the irradiated solid mixture of the monomers to the temperature above its melting point can be effected at any heating rate, but, as has already been said, the heating to the temperature not above −30°C should preferably be effected at a rate of 0.1°–0.5° per minute. Further heating can be done at a higher rate, for example 5°–15° per minute.

The result of the copolymerization process is copolymers of acetone with acrylic acid or its derivatives in the form of a solution in unreacted monomers or in the form of a gel swollen in the monomers (depending on the yield of the copolymer). As heating is discontinued, the copolymers of acetone are isolated from the reaction mixture by any known technique, for example, by re-precipitation from solvents (acetone, alcohol) or by distilling off the non-polymerized monomers.

For a better understanding of the invention, the following examples of its practical embodiment are given by way of illustration.

EXAMPLE 1

A solution of 3.0 g of acrylic acid in 1.5 g of acetone was placed in a glass ampoule of 8 mm in dia. and deaerated. The ampoule was sealed and placed into a Dewar flask filled with liquid nitrogen. The solution became solid in about one minute (the rate of freezing was about 200° per minute). The frozen mixture of the monomers was irradiated by gamma rays of Co[60] at a temperature of −196°C to the integral dose of the ionizing radiation of 10 Mrad. The ampoule was then defrosted by heating the irradiated mixture to room temperature, at a rate of 0.5° per minute in the interval of temperatures from −196° to −30°C, and then the rate of defrosting was increased to 5° per minute (from −30°C to room temperature). As soon as the reaction mixture was heated to room temperature, unreacted monomers were distilled from it in vacuum, while the copolymer of acetone with acrylic acid was dried to constant weight. The yield of the copolymer was 80 per cent of the weight of the starting reaction mixture. By titrating the unreacted acrylic acid, it was established that the copolymer contained one mole of acetone per three moles of acrylic acid. The prepared copolymer was white, and films manufactured out of it were transparent. The said copolymer was soluble in alcohol, dioxane and water. When heated to a temperature of 40°−60°C it was partly cross-linked. The copolymer was thermostable (when heated in vacuum for 6 hours, its loss in weight was 8 per cent at 120°C and 20 per cent at 200°C.

EXAMPLE 2

The reaction mixture was prepared from 2.8 g of acetone and 0.03 g of acrylic acid. The procedure was the same as described in Example 1, except that the starting mixture of the monomers was frozed at a rate of 100° per minute. The yield of the copolymer of acetone with acrylic acid was 1.4 per cent by weight of the starting reaction mixture. By titrating the unreacted acrylic acid, it was established that the copolymer contained one mole of acetone per 1.2 mole of acrylic acid. The copolymer was thermostable (when heated for 6 hours in vacuum its loss of weight was 12 per cent at 120°C and 27 per cent at 200°C).

EXAMPLE 3

2 g of a 10 per cent solution of methylacrylate in acetone were placed in a glass ampoule of 6 mm in diameter and air was removed. The ampoule was then sealed and placed in a Dewar flask filled with liquid nitrogen. The solution was frozen by cooling to the temperature of −170°C at a rate of about 500° per minute. The solid mixture of the monomers was irradiated by gamma rays of Co[60] at a temperature of −170°C to the integral dose of ionizing radiation of 1 Mrad. The irradiated mixture of the monomers was heated to room temperature at a rate of 0.1° per minute (from the temperature of −170° to −30°C) and at a rate of 5° per minute (from 31 30° to room temperature). On the termination of heating, the copolymer of acetone with methyl acrylate was isolated from the reaction mixture as described in Example 1. The yield was 0.35 g (i.e. 17 per cent of the weight of the starting reaction mixture) of white thermostable product. When heated in vacuum for 6 hours, its loss in weight was 7 per cent at 120°C and 16 per cent at 200°C.

EXAMPLE 4

A solution of 2 g of acrylic acid in 1 g of acetone was placed into a glass ampoule of 8 mm in diameter and deaerated. The ampoule was then sealed and placed into a Dewar flask filled with liquid nitrogen. The solution was frozen by chilling to the temperature of −196°C at a rate of 200° per minute. The frozen mixture of the monomer was irradiated by gamma rays of Co[60] at a temperature of −196°C to the integral dose of radiation of 15 Mrad. The irradiated mixture of the monomers was then heated to the temperature of −50°C. The heating from −196° to 160°C was effected at a rate of 5° per minute, from −160° to −80°C at a rate of 0.08° per minute, and from −80° to −50°C at a rate of 1° per minute. On the termination of heating, the copolymer of acetone with acrylic acid was isolated at a temperature of −50°C from the reaction mixture by washing the unreacted monomers with ethyl ether. The yield was 1.5 g (50 per cent of the weight of the starting reaction mixture) of the copolymer containing 1 mole of acetone per 2.8 moles of acrylic acid. The thermostability of the copolymer was the same in Example 1.

EXAMPLE 5

A solution of 0.25 g of acrylic acid in 0.25 g of acetone was placed in a glass ampoule of 4 mm in diameter and deaerated. The ampoule was then sealed and placed in a Dewar flask filled with liquid nitrogen. The solution was frozen by chilling to a temperature of −160°C at a rate of 600° per minute. The solid mixture of the monomers was irradiated by fast electrons (the source of fast electrons was a linear accelerator) at a temperature of −160°C to the integral dose of the ionizing radiation of 0.5 Mrad. The irradiated mixture of the monomers was then heated to the temperature of 40°C at a rate of one degree per minute. On the termination of heating, the copolymer of acetone with acrylic acid was isolated from the reaction mixture by a procedure similar to that described in Example 1. The yield was 0.15 g (30 per cent of the weight of the starting reaction mixture) of the copolymer which contained 0.95 mole of acetone per mole of acrylic acid. The obtained product was thermostable (during heating in vacuum for 6 hours its loss in weight was 9 per cent at 120 and 22 per cent at 200°C).

EXAMPLE 6

A solution of 0.2 g of butyl acrylate in 0.8 g of acetone was placed in a glass ampoule of 8 mm in diameter and deaerated. The ampoule was then sealed and placed in a Dewar flask filled with liquid nitrogen. The solution was frozen by chilling to the temperature of −196°C at a rate of 250°−300° per minute. The solid mixture of the monomers was irradiated by gamma rays of Co[60] to the integral dose of the ionizing radiation of 5 Mrad. The irradiated mixture was then heated to room temperature. At the range of temperatures from −196° to −40°C the heating rate was 0.3° per minute, and in the range from −40° to room temperature the heating rate was 10° per minute. On the termination of heating, the copolymer of acetone with butyl acrylate was isolated from the reaction mixture by the same procedure as described in Example 1. The yield was 0.28 g (28 per cent of the weight of the starting reaction mixture) of the copolymer. The copolymer was thermostable (during heating in vacuum for 6 hours its loss in weight was 6 per cent at 120 and 16 per cent at 200°C).

EXAMPLE 7

A solution of 1 g of acrylic acid in 0.3 g of acetone was placed in a glass ampoule of 8 mm in diameter and deaerated. The ampoule was then sealed and placed into a Dewar flask filled with liquid nitrogen. The solution was frozen by chilling to a temperature of −170°C at a rate of 200° per minute. The solid mixture of the monomers was irradiated by fast electrons (the source of fast electrons was a linear accelerator) at a temperature of 170°C to the integral dose of ionizing radiation of 8 Mrad. The irradiated mixture of the monomers was heated to the temperature of −30°C at a rate of 0.4° per minute. On the termination of heating the copolymer of acetone with acrylic acid was isolated from the reaction mixture at a temperature of −30°C by washing off the unreacted monomers with ethyl ether. The yield was 1.15 g (88 per cent of the weight of the starting reaction mixture) of the copolymer containing 1 mole of acetone per 3 moles of acrylic acid. The thermostability of the copolymer was the same as in Example 1.

We claim:

1. Copolymers of acetone with a compound selected from the group consisting of acrylic acid and its esters, anhydrides, and imides.

2. A method for preparing copolymers of acetone with a member of the group consisting of acrylic acid and its esters, anhydrides, and imides, comprising freezing a mixture of acetone and said member, subjecting the obtained solid mixture of the monomers to ionizing radiation, heating the irradiated solid mixture of the monomers to a temperature above its melting point, and isolating the end product.

3. A method according to claim 2, wherein the mixture of starting monomers is frozen at a rate of 200°–500°C per minute.

4. A method according to claim 2, wherein the solid mixture of the monomers is acted upon by ionizing radiation, the integral dose being 1–10 Mrad.

5. A method according to claim 2, wherein the irradiated solid mixture of the monomers is heated to a temperature of up to −30°C.

6. A method according to claim 2, wherein the irradiated solid mixture of the monomers is heated to a temperature above −30°C.

7. A method according to claim 2, wherein the irradiated solid mixture of the monomers is heated to a temperature of up to −30°C at a rate of 0.1°–0.5° per minute.

* * * * *